Patented Sept. 26, 1950

2,523,875

UNITED STATES PATENT OFFICE 2,523,875

PRODUCTION OF A PROTECTIVE CARBON

Jacque C. Morrell and George T. Tobiasson, Chicago, Ill., assignors, by mesne assignments, to the United States of America as represented by the Secretary of War No Drawing. Application May 1, 1942, Serial No. 441,273

11 Claims. (Cl. 252—447)

The invention described herein may be manufactured and used by or for the Government for governmental purposes, without the payment to us of any royalty thereon.

This invention relates to the improvement of adsorbent materials for use as gas absorbents in gas masks and shelters. It relates more particularly to a process for depositing active catalysts upon adsorbent surfaces such as those of activated carbons to improve by chemical and catalytic, as well as by adsorptive means, the ability of the surfaces to remove poisonous gases from gaseous mixtures.

Activated carbons which may be treated to improve their activity for removing poisonous gases and vapors from air are obtainable from several sources. Coconut charcoal is produced from coconut shells which are dried, then carbonized and activated at a temperature of from about 1600 to about 1700° F. in the presence of steam or of a mixture of steam and flue gas which may contain small amounts of air, and in some activation treatments, air is used as such. Fruit pits are also convertible into activated chars by using similar methods. Other activated carbons, generally referred to as domestic or synthetic chars, are manufactured from coal, coke, wood, or wood charcoal or various mixtures of the same, employing in some cases specific types of coal with or without the addition of wood char. Such carbonaceous material is generally dried, ground to a fine powder, mixed with a binder as pitch, and briquetted; after which the briquettes are crushed to give granular material of about 6 to 20 mesh particle size. The components may also be treated with various chemical reagents before mixing. Similarly wood may be treated with reagents such as zinc chloride and subsequently carbonized and activated. This granular material is then carbonized and activated following the general procedure mentioned for producing coconut char.

Broadly, an activated carbon or other material is said to absorb a poisonous gas or vapor from air or other gas mixture when it substantially removes said gas or vapor by any means, which may include adsorption, oxidation, etc. Heretofore a number of metal compounds have been deposited on activated carbons to increase their abilities to absorb poisonous gases and vapors from air containing them. Of these metal compounds, copper oxide is a particularly important example. One method previously used for depositing active copper oxide on an adsorbent to produce an absorptive material comprises preparing a solution of a copper ammonium carbonate complex, impregnating the adsorbent with the solution and subsequently heating to dry the impregnated material and to convert deposited salts into an active copper oxide, especially to cupric oxide. Thus in an established practice, ammonia, carbon dioxide, and air are bubbled through a reactor column containing water and scrap copper for a more or less prolonged period of time until a solution is formed which contains approximately 7 to 9 per cent by weight of copper, 10 to 12 per cent of ammonia, and 5 to 6 per cent of carbon dioxide by analysis. The adsorbent or char is impregnated with this solution by wetting or soaking, and is subsequently drained to remove the excess solution. The impregnated material is then heated to dry it and to decompose the deposited copper ammonium carbonate complex and to drive off carbon dioxide and ammonia. Recently it has been found that the absorptive properties of absorbents may be improved by increasing the ammonia and carbon dioxide content of the impregnating solution, either by fortifying this solution by further addition of ammonia and carbon dioxide, or by the addition to the solution of ammonia and salts such as basic copper carbonate and ammonium carbonate. The solution may also be prepared entirely from these compounds.

Heretofore the absorptive capacity of impregnated chars prepared as above indicated has been further improved by secondary impregnation. Thus a dried activated carbon impregnated with copper ammonium carbonate complex has been further impregnated using a solution containing approximately 5.0 per cent by weight of sodium hydroxide and about 0.5 per cent of sodium thiocyanate, and has then been dried carefully to obtain a carbon having increased absorptiveness for gases such as cyanogen chloride. It has also been found that as a result of this secondary impregnation the absorbent may deteriorate in storage or take on moisture much more readily. Because of this deterioration or humidification, the absorptive capacity of the absorbent for arsine is greatly reduced and under some conditions that are encountered, such as tropical conditions, the amount of moisture taken up is so large that the absorption is practically nil. The effect of this deterioration has been noted to a varying degree in the decrease in absorption of other poisonous gases.

Previously the absorptive capacities of activated carbons have also been improved by other secondary treatments. Thus activated carbon as such or after impregnation with copper oxide has been sprayed with a solution of silver nitrate to obtain absorbents having increased absorptiveness particularly to arsine when the absorbents are used under humid conditions. Although the absorptive capacity has been improved by the secondary treatment, this form of treatment has the disadvantage that the silver may be poorly distributed on the absorbent and also this spraying treatment may result in a lowered capacity of the absorbent for the absorption of acid gases such as hydrocyanic acid.

In the related patent applications Serial Nos. 441,270, 441,271, 441,272, now U. S. 2,511,288, U. S. 2,513,508, U. S. 2,511,289, respectively, we describe several methods of improving the absorptive capacities of activated carbons by including the additional impregnating materials as silver compounds and/or thiocyanates in one composite or integrated impregnating solution also containing copper salts, and we disclose several single-stage impregnating procedures. Now we find that the absorptive properties of chars and other activated carbons for certain gases, particularly hydrogen cyanide, can be improved further by pretreating said chars with other substances.

In one specific embodiment the present invention comprises a process for preparing absorbents of high activity for removing poisonous fluids from gas mixtures, and particularly from air contaminated thereby, which comprises preparing an aqueous solution of a metal compound, impregnating an activated carbon with said aqueous solution, heating the impregnating material to form a composite of activated carbon and metal oxide, preparing a second aqueous solution comprising essentially copper ammonium complex, a soluble silver compound and a soluble thiocyanate, impregnating the composite of activated carbon and metal oxide with said second solution, and heating the resultant impregnated material to remove water and volatile products and thus produce an impregnated carbon of highly improved absorptive capacity for poisonous fluids and particularly gases and vapors.

In a further embodiment an alkaline material may also be added to the second or composite solution employed for further impregnating the composite of activated carbon and metal oxide.

According to one embodiment of the present invention an activated carbon is subjected to two successive impregnation and heating stages to improve its absorptive capacity for poisonous gases such as hydrogen cyanide, arsine, cyanogen chloride, etc. The first impregnation is made by employing an aqueous solution of a compound of a heavy metal selected from the members of groups 4, 5, 6, 7, and 8 of the periodic table and also certain heavy metals of groups 1 and 2, such as gold and silver of group 1, and mercury of group 2. Compounds more generally applicable in this first impregnation treatment comprise water soluble compounds of the heavy metals of the fourth series of the periodic table including titanium, vanadium, chromium, manganese, iron, cobalt, and nickel. Potassium, calcium, and scandium which are also in the fourth series of the periodic table have specific gravities below 3.0 and therefore are considered as light metals. The activated carbon so impregnated with a compound of vanadium, chromium, manganese, cobalt, molybdenum, etc., is then dried and heated to drive off water and to substantially convert the impregnating compound into the metal oxide. The resultant carbon-metal oxide composite is then subjected to the second impregnation step as hereinafter set forth.

For carrying out the second impregnation step of the process a solution of copper ammonium carbonate complex, preferably with a relatively high ammonia content, is prepared and soluble silver compound or soluble thiocyanate is incorporated therein or both a silver compound and a thiocyanate may be added thereto. Thus silver nitrate for example, is dissolved in water to form a rather concentrated solution such as one containing 10 to 50 per cent, more or less, of silver nitrate, and this solution is added gradually with stirring to the copper ammonium carbonate solution. The concentration of the added silver solution is not critical, as the main consideration is that of keeping at a minimum the dilution of the copper impregnating solution, although in some cases the concentration must be controlled and it is especially desirable to maintain an excess of water soluble silver compound over that which reacts with the thiocyanate. The greater the dilution of the silver nitrate solution, the greater will be the diluting effect upon the copper ammonium carbonate impregnating solution. Any precipitation effects obtained when adding the silver compound are of a temporary nature since we have found that any precipitate formed is readily redissolved while the agitation or stirring is continued. The amount of silver added to the copper solution may vary generally upwards to 0.1 per cent by weight or more, but preferably the amount of soluble silver salt added to the solution is such as to deposit on the absorbent approximately 0.02 to about 0.10 per cent of silver. When an amount of silver nitrate corresponding to this amount of silver is used, there is little or no evidence of a segregation of sediment on standing after adding the thiocyanate in the amount of e. g. 0.5 per cent, as will be subsequently described. In most cases however it is desirable to increase the silver concentration and reduce the thiocyanate concentration down to say 0.25 per cent.

Similarly, a soluble thiocyanate such as sodium thiocyanate may be dissolved in water to form a rather concentrated solution such as a 10 to 50 per cent solution, and the thiocyanate solution may be gradually added to the copper solution while stirring. We have found that any precipitation effects which may occur at this point are of a temporary nature since the precipitate is readily redissolved while continuing the agitating or stirring. The amount of thiocyanate to be added to the copper solution may vary upwards to 2.0 per cent or more, depending upon costs, the type of absorbent base, and the product desired. In many preparations we have found that approximately 0.5 per cent of sodium thiocyanate gives good results, but when the amount of silver corresponding to this concentration causes precipitation when added it is preferable to reduce the thiocyanate concentration and increase the silver to have an excess of the latter.

Of great importance is the fact that the impregnation with the integrated or composite solution produces insoluble thiocyanate compounds, presumably copper and silver thiocyanate, whereas stepwise impregnation with sodium thiocyanate gives a product from which sodium thiocyanate is readily removed by water.

Further, a small amount of alkali may also be added to the copper impregnating solution in addition to the thiocyanate. After addition of too large an amount of alkali, undesirable effects have been observed in the hydration characteristics of the resultant absorbent. Thus, we have observed for example, that for some chars the addition of 5.0 per cent by weight of sodium hydroxide is undesirable whereas the addition of approximately 1.0 per cent of sodium hydroxide has desirable effects in increasing the absorption or removal of some poisonous gases.

In the addition of soluble thiocyanates and silver compounds to the copper ammonium carbonate solution, there is substantially no limitation as to the manner or order in which these are added since they may, for example, be included with the copper solution during its preparation with good results. In some cases the thiocyanate may be incorporated in the copper-containing solution, the composite of activated carbon and metal oxide may be impregnated thereby, and after draining from excess solution the impregnated material may then be sprayed with the solution containing the silver compound, after which the resultant impregnated carbon is dried and calcined.

According to the foregoing embodiment of the present invention the adsorbent or charcoal-metal oxide composite formed in the first step of the process is wetted by the integrated impregnating solution in any desirable manner. Thus, for example, a composite of activated charcoal and manganese oxide is soaked in the integrated solution containing copper, silver, and thiocyanate compounds and the excess solution is drained from the impregnated material. The wetted char is then directed to drying and conversion or calcining treatment to remove moisture and to decompose the copper ammonium carbonate complex and some of the other impregnated compounds, and to remove gaseous decomposition products which are largely ammonia and carbon dioxide. Thus, the wet impregnated char may be directed to a rotary dryer and raised to a temperature of about 300° F. so as to effect the desired drying and conversion treatment. The maximum temperature used during drying and calcining varies somewhat with the type of char employed and the nature of the impregnating solution so that in some instances, temperatures as high as 400 to 500° F. may be used for a short period of time without substantial detrimental effects to the impregnated char. More frequently, however, the temperature employed may be from about 275° to about 350° F. and care should be observed so that the char does not ignite at high temperatures in the presence of air as a result of the metal oxide catalysts deposited thereon. After cooling, the chars are packed in air-tight containers to exclude moisture and other readily absorbed materials. The characteristics of several impregnated chars will be illustrated in the specific examples hereinafter set forth.

It is apparent from the above description of the process that considerable savings in equipment and labor costs are thus effected since only two impregnation and drying treatments are employed instead of a series of at least three or more impregnations each followed by drying and calcining steps or accompanied by other preliminary or secondary treatments. Besides the above indicated advantages of the process, the impregnated and calcined charcoal has a very high absorptive capacity for poisonous gases, liquids, and vapors. Furthermore, it has been found previously that when sodium thiocyanate is employed in a final impregnation treatment, the sodium thiocyanate may be substantially extracted with water from the impregnated char produced by methods of the prior art, whereas the char produced by our process which includes the final integrated impregnation gives up very little sodium thiocyanate when extracted with water. It is not known exactly why the char impregnated by the present process is superior to that of the prior art, but it may be due in part to factors such as the presence of copper thiocyanate, the presence of less undecomposed copper carbonate salts, and better distribution of silver on the absorbent surfaces.

The following example is given to illustrate the process of impregnating activated carbons according to the foregoing embodiment of the invention and to set forth some of the results obtained in employing these materials for removing poisonous gases from air, although the data given are not intended to limit the broad scope of the invention.

A coconut charcoal in the form of 6 to 20 mesh size particles was impregnated with an aqueous solution of manganous nitrate of such a concentration that the thoroughly wetted and drained charcoal contained an amount of this manganese salt corresponding to 3.0 per cent of manganese based on the weight of the previously dried charcoal. The manganese-impregnated charcoal was then dried and heated at 300° F. for several hours. The resultant granular material comprising essentially activated charcoal and manganese oxide dispersed therein was then impregnated with a composite or integrated solution prepared as follows to contain water soluble compounds of copper and silver.

For the second impregnation step of the process a solution was prepared by bubbling ammonia, carbon dioxide, and air through a reactor containing copper wire and water to form an intermediate solution of copper ammonium carbonate complex found by analysis to contain 7.7 per cent by weight of copper, 8.0 per cent of ammonia, and 4.6 per cent of carbon dioxide. This intermediate solution was then fortified with aqueous ammonia, hydrated copper carbonate, and ammonium carbonate to form a solution which upon analysis was found to contain approximately 10 per cent by weight of copper, 16 per cent of ammonia, and 11 per cent of carbon dioxide. Silver nitrate in the form of a 50 per cent aqueous solution was gradually stirred into the copper impregnating solution in an amount so as to deposit approximately 0.1 per cent by weight of silver on the charcoal being impregnated.

The composite of coconut charcoal and manganese oxide was then impregnated with this solution at room temperature and the excess solution was drained off. The resultant impregnated char was then dried for several hours and gradually raised to a temperature of approximately 300° F. This char was tested according to the official C. W. S. tube test procedures against air mixtures containing hydrocyanic acid, arsine, and cyanogen chloride, respectively. A char prepared in a similar manner but impregnated with only the ammonium copper carbonate solution was also tested. Results of these comparative tests were as follows:

| Char Impregnated With— | Gas Lives in Minutes When Tested on— | | |
|---|---|---|---|
|  | HCN | Arsine | CNCl |
| Copper solution only | 135 | 85 | 57 |
| 3% by wt. of manganese in 1st stage, then dried and given 2nd impregnation with integrated solution containing copper and silver compounds | 205 | 79 | 55 |

When sodium thiocyanate was also present with copper and silver compounds in the integrated solution, the charcoal-manganese oxide composite impregnated thereby had a cyanogen chloride life of about 70 to 75 minutes.

Of much greater significance, however, are the life test results obtained for these chars on arsine absorptiveness under conditions simulating the conditions of the tropics using highly humidified chars. While the char which was impregnated with the copper solution only had an arsine life of zero minutes, the charcoal impregnated first with manganese and then with copper and silver, according to our improved process, had an arsine life of 40 minutes.

It is apparent from the above data that a char after treatment according to the process of the present invention had higher gas absorptiveness for all of the typical poisonous test gases than did the char impregnated by the methods of the prior art. The char impregnated by the present process had this high absorptiveness not only when employed under temperate conditions but especially when employed under tropical conditions with high relative humidity.

Although the foregoing two-step method of impregnating activated carbons has been found to be very satisfactory, as the above test results indicate, it will be understood that the invention is not limited thereto and that high grade products may be produced in a single-step impregnation. In such a single-step process, an integrated or composite impregnating solution may be used containing a soluble salt of a selected heavy metal, and a soluble copper salt and/or a soluble silver compound. In addition a soluble thiocyanate may be included in the solution. By way of a specific example of such a solution to be used in a single-step impregnation, an aqueous solution may be prepared containing manganous nitrate, copper ammonium carbonate complex, and silver nitrate. In addition, sodium thiocyanate may be included so as to extend the cyanogen chloride life of the treated carbon.

The ingredients may be included in the foregoing single-step solution in such amounts that the final products resulting from treatment therewith will be present in the activated carbon in substantially the same amounts as when the above two-step process is used.

The character of the invention and the type of results obtained by its use are evident from the preceding specification and example, although they are not to be construed as to impose undue limitations upon the generally broad scope of the invention.

We claim as our invention:

1. A process for preparing an absorbent of high activity for removing poisonous gases from air contaminated thereby which comprises impregnating an activated carbon with an aqueous solution of a compound of a heavy metal of the fourth series of the periodic table, heating the impregnated material to form a composite of activated carbon and metal oxide, preparing a second aqueous solution of a copper salt, a soluble silver compound and a soluble thiocyanate, impregnating the composite of activated carbon and metal oxide with said second solution, drying and calcining the resultant impregnated material at a temperature of from about 275° F., to 350° F., for a sufficient period of time to remove water and other volatile products and to form an impregnated carbon of improved absorptive activity.

2. A process for preparing an absorbent of high activity for removing poisonous gases from air contaminated thereby which comprises impregnating an activated carbon with an aqueous solution of a compound of a heavy metal of the fourth series of the periodic table selected from a group of metals consisting of vanadium, chromium and manganese, heating the impregnated material to form a composite of activated carbon and metal oxide, preparing a second aqueous solution of copper ammonium carbonate, a soluble silver compound and a soluble thiocyanate, impregnating the composite of activated carbon and metal oxide with said second solution, drying and calcining the resultant impregnated material at a temperature between 275° F., to 350° F., for a sufficient period of time to remove water and other volatile products and to form an impregnated carbon of improved absorptive activity.

3. A process for preparing an absorbent of high activity for removing poisonous gases from air contaminated thereby which comprises impregnating an activated carbon with an aqueous solution of manganese, heating the impregnated material to form a composite of activated carbon and metal oxide, preparing a second aqueous solution of copper ammonium carbonate and a soluble silver compound, impregnating the composite of activated carbon and metal oxide with said second solution, drying and calcining the resultant impregnated material at a temperature of from 275° F., to 350° F., for a sufficient period of time to remove water and other volatile products and to form an impregnated carbon of improved absorptive activity.

4. The process of claim 1, further characterized in that said soluble silver compound comprises silver nitrate.

5. The process of claim 1, further characterized in that said soluble thiocyanate comprises a thiocyanate of an alkali metal.

6. The process of claim 2, further characterized in that said heavy metal of the Fourth Series of the Periodic Table comprises vanadium.

7. The process of claim 2, further characterized in that said heavy metal of the Fourth Series of the Periodic Table comprises chromium.

8. The process of claim 2, further characterized in that said heavy metal of the Fourth Series of the Periodic Table comprises manganese.

9. A process for preparing an absorbent of high activity for removing poisonous gases from air contaminated thereby which comprises impregnating an activated carbon with an aqueous solution of manganous nitrate, heating the impregnated material to form a composite of activated carbon and manganese oxide, preparing a second aqueous solution of copper ammonium carbonate, silver nitrate and sodium thiocyanate, impregnating the composite of activated carbon and manganese oxide with said second solution, drying and heating the resultant impregnated material at a temperature of from about 275° to about 350° F. for a sufficient period of time to calcine said material.

10. A process for preparing an absorbent of high activity for removing poisonous gases from air contaminated thereby which comprises impregnating an activated carbon with an aqueous solution of manganous nitrate, heating the impregnated material to form a composite of activated carbon and manganese oxide, preparing a second aqueous solution of copper ammonium carbonate and silver nitrate, impregnating the composite of activated carbon and manganese oxide with said second solution, drying and heating the resultant impregnated material at a temperature of from about 275° to about 350° F. for a sufficient period of time to calcine said material.

11. A process for preparing an absorbent of high activity for removing poisonous gases from air contaminated thereby which comprises impregnating an activated carbon with an aqueous solution of manganous nitrate, heating the impregnated material to form a composite of activated carbon and manganese oxide, preparing a second aqueous solution of copper ammonium carbonate, silver nitrate, sodium hydroxide and sodium thiocyanate, impregnating the composite of activated carbon and manganese oxide with said second solution, drying and heating the resultant impregnated material at a temperature of from about 275° to about 350° F. until said material is calcined.

JACQUE C. MORRELL.
GEORGE T. TOBIASSON.

REFERENCES CITED

The following references are of record in the file of this patent:

UNITED STATES PATENTS

| Number | Name | Date |
|---|---|---|
| 1,519,470 | Wilson | Dec. 16, 1924 |
| 1,731,473 | Naugle | Oct. 15, 1929 |
| 2,076,645 | Ingols et al. | Apr. 13, 1937 |
| 2,212,593 | Dittrich | Aug. 27, 1940 |
| 2,227,672 | Pier et al. | Jan. 7, 1941 |